…

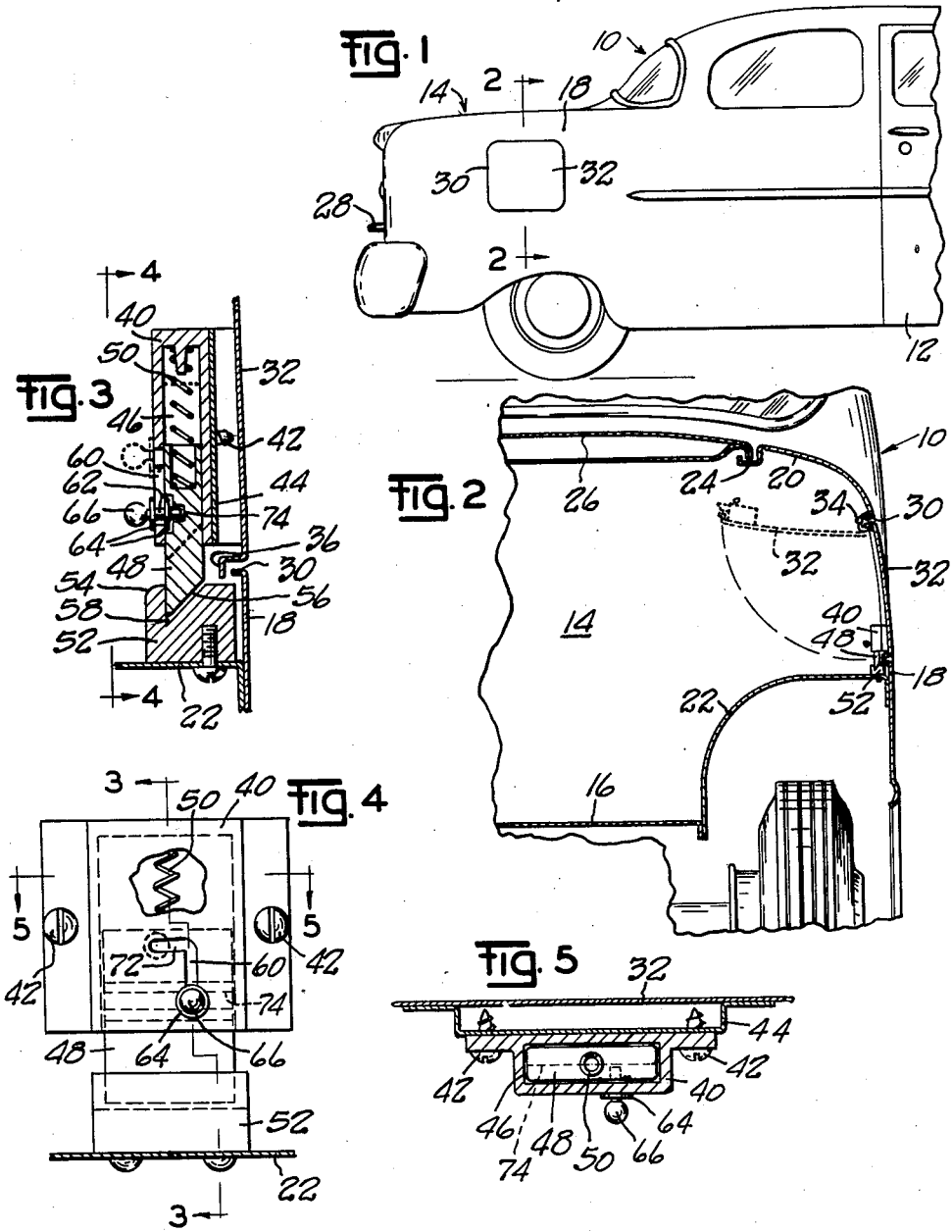

United States Patent Office 2,941,837  
Patented June 21, 1960

2,941,837

PACKAGE RECEIVER FOR AUTOMOBILES

Duane S. McCready, 104 Island Drive, La Porte, Ind.

Filed Dec. 30, 1957, Ser. No. 705,944

7 Claims. (Cl. 296—37)

This invention relates to package receivers for automobiles.

Many persons, who use an automobile while on a shopping trip or while doing business, experience inconvenience due to the need to unlock a door or the trunk compartment of the automobile in order to place articles within the automobile. This is particularly objectionable in cases where the person is carrying packages which make it difficult to search for and locate a key and to manipulate the key and the lock. The condition can be avoided if the automobile doors or trunk compartment are not locked, but this invites pilferage and automobile theft, and therefore is not considered to be a wise practice. Thus it is particularly important that the doors of an automobile should be locked if packages or other items are contained within the passenger compartment of the car to be readily visible to passersby. The maintenance of an unlocked condition of the trunk compartment door of an automobile is also inadvisable because of the fact that the spare tire of the car and tools and other items are usually carried in the trunk constantly and may be stolen if the trunk is not locked.

Inasmuch as the trunk compartment of an automobile does not contain any transparent portion through which its contents may be viewed, prospective pilferers are not encouraged to tamper with a trunk because they are not certain that any reward can be gained when the trunk is opened. Therefore, the curiosity of would-be thieves is not aroused when packages are stored within the trunk compartment of the automobile. I have conceived a construction which makes it possible to take advantage of the desirable characteristics of the trunk compartment as a storage place for packages or other articles and which at the same time renders it unnecessary to operate a lock in order to introduce packages into the trunk compartment, and it is the primary object of this invention to provide a device which will accomplish that result.

A further object is to provide the trunk compartment of an automobile with a package-receiving opening spaced from the opening therein through which items are normally introduced into the trunk compartment, which package opening is normally closed by a releasable closure element carrying means selectively operable for locking the closure.

A further object is to provide a closure member for a package opening in a vehicle with spring urged hinging means normally holding the closure closed and with a latch having a concealed location and readily manipulable between a latched and a released position.

Other objects will be apparent from the following specification.

In the drawing:

Fig. 1 is a fragmentary side view of an automobile illustrating my package receiver;

Fig. 2 is a fragmentary enlarged transverse vertical sectional view taken on line 2—2 of Fig. 1;

Fig. 3 is an enlarged vertical detail sectional view taken on line 3—3 of Fig. 4;

Fig. 4 is an inner face view of the latch of my device viewed in the direction of the arrows 4—4 of Fig. 3;

Fig. 5 is a transverse sectional view taken on line 5—5 of Fig. 4.

Referring to the drawing which illustrates one embodiment of the invention, the numeral 10 designates an automobile having a body provided with two or more doors 12 giving access to the passenger compartment of the automobile and having a trunk compartment 14. The trunk compartment has a floor 16, side walls 18, top wall 20 and a rear wall (not shown) and may be outlined in part by wheel well portions 22 joining the side walls and the floor 16. The trunk has the usual top opening which may be outlined by a marginal flange 24 and which opening preferably extends through a substantial part of the back wall of the trunk compartment. A trunk lid 26 is pivoted to the trunk to span and seal the trunk opening and is provided with a handle 28 which may have suitable exteriorly accessible and manipulatable lock means (not shown) of the character well understood in the art.

My invention contemplates the formation of an opening 30 in the trunk spaced from the first named opening and preferably formed in a side wall 18 at the righthand side of the automobile, for example, above the wheel well portion 22. The opening 30 may be of any size desired, and preferably will be of a size of eight by ten inches or larger, so that it will accommodate passage of a shopping bag or paper sack therethrough. A closure 32 is adapted to span the opening 30 and preferably is hinged to the trunk by any suitable hinge means 34. The closure will preferably be urged or biased to closed position, as by hinging thereof by means of a spring urged hinge capable of maintaining the closure in closed position during normal operation of the automobile. The closure will preferably be provided with a stop 36 limiting swinging thereof in one direction and, in the preferred embodiment, the closure will be hinged to swing inwardly from a flush or closed position relative to the adjacent parts of the trunk. Suitable noise-damping means (not shown) may be carried by the closure member 32 to serve the purpose of eliminating rattling or pounding of the closure 32 as the automobile travels over rough road while the closure is in an unlocked condition.

Suitable selectively operable concealed latch means may be provided in association with the closure 32. The concealed character of this latch is important to insure against invitation to pilferage or tampering with the lock, and its ready accessibility is important so that it may be manipulated while the closure is in a partially open position without great inconvenience to or exertion by the operator.

In the form of the lock selected for illustration, a bolt carrier 40 is secured to the closure 32 in any suitable manner, as by means of securing members 42 anchored at an inwardly offset lock-receiving member 44 welded or otherwise secured to the closure 32. The bolt carrier 40 includes a socket 46 within which the bolt 48 is slidable under the influence of a spring 50 confined within the bolt socket. A strike plate 52 is carried by a part of the trunk, such as the wheel well part 22, and preferably has a rounded or curved surface 54 engageable by a bevel edge 56 of the bolt when the closure 32 is swung to a closed position with the bolt 48 in spring urged projected position. The strike plate 52 also includes a bolt-receiving groove or recess 58 for retaining the bolt in closure-locking position as illustrated in Fig. 3.

The bolt carrier 40 is provided with a selectively operable bolt retainer. In the construction shown, bolt carrier 40 has a bayonet slot 60 through which extends the shank 62 of a retainer pin having spaced shoulders or flanges 64 slidably engageable at the inner and outer faces of the carrier 40 for positioning the pin in slidable relation to the bayonet slot and in condition for manipulation thereof by manual gripping of the head 66 on the end thereof. The transverse portion 72 of the slot 60, that is, the portion thereof which extends transverse of the direction of sliding movement of the bolt 48, is inclined or somewhat oblique relative to a line perpendicular to the length of the bolt 48, as illustrated in Fig. 4. The bolt 48 has a transverse groove 74 in the side face thereof adjacent the slot 60. Groove 74 slidably receives the inner end of the latch pin 62 and the innermost guide flange 64.

The lock is so constructed and arranged that when the pin 62 is lodged in the transverse run 72 of the bayonet slot 60, the spring 50 will lock the pin in retracted position, as illustrated in dotted lines in Figs. 3 and 4, so that the closure member 32 may be opened and closed at will. The lock is rendered operative by simply sliding the pin 62 in the cross run 72 of the bayonet slot to a position aligned with the longitudinal portion of that slot at which it is free to travel incident to projection of the bolt 48 by the spring 50.

In the use of the device it will be apparent that the closure member 32 may normally be unlocked because it is of restricted size and is spring urged to a normal closed position. Whenever it is desired to deposit an article in the trunk of the car, the closure 32 can be swung open against the spring thereof and the article passed into the trunk. In cases where the aperture 30 is located above the wheel well 22, only a slight movement of the article past the path of swinging movement of the door or closure 32 will cause the article to slide free of the well to a position substantially remote from the opening 30 and difficult of access by reaching through said opening 30. The closure 32 will automatically return to closed position after the article has been passed therethrough and passersby cannot see the articles carried within the trunk. It will be presumed, of course, that the trunk closure 26 will be closed and locked at this time.

If a shopper plans to make a number of purchases and to deposit them in the trunk successively for storage until all purchases have been made, the risk of pilferage is small, even though the closure 32 remains unlocked. This is true by reason of the concealment of the packages within the trunk, the locked condition of the trunk lid, and the remote location of the packages in the trunk with respect to the access opening 30. However, the access opening 30 may be sealed whenever the user so desires by the simple expedient of changing the setting of the lock from the position illustrated in dotted lines in Figs. 3 and 4 to the position illustrated in full lines, wherein the pin 62 seats in the lower or free end of the bayonet slot 60 and is urged to extended locking position seated in the notch 58 of the striker plate 52 by the coil spring 50. It will be observed that the lock is positioned adjacent the free edge of the closure and that the manipulation of the lock can be accomplished by reaching therebehind to engage the head 66 and slide it laterally until it is aligned with the longitudinal portion of the slot 60. Release of the closure member 32 from open position, particularly in cases where the lock is mounted at the lower end of the closure as here illustrated, results in swinging of the closure 32 toward closed position with sufficient force to cam the bolt 48 when its beveled surface 56 engages the surface 54 of the striker plate 52, which camming action retracts the bolt 48 sufficiently to permit it to slide past the inner portion of the striker plate 52 and to register with and project into the recess 58 of the striker plate.

The access opening and the closure panel 32 spanning the same, and the lock therefor, will preferably be positioned within convenient reach of a person standing behind the automobile when the trunk lid or closure member 26 is open. Thus it will be apparent that once the lock for the package closure 32 has been set in closed or locked position, it will remain so locked until it is released to the unlatched position shown in dotted lines. This can be done when the trunk lid is open and, for convenience, the latch should be positioned within easy reach of a person standing behind the automobile who has opened the trunk lid, or by remote control means (not shown) such as a solenoid actuator, as well understood in the electrical arts.

While the preferred embodiment of the invention has been illustrated and described, it will be understood that changes in the construction may be made within the scope of the appended claims without departing from the spirit of the invention.

I claim:

1. In an automobile having a trunk compartment accessible through a large top opening spanned by a lid having a lock, the improvement consisting of a second opening at the side of and communicating with said trunk compartment spaced from said first opening, a closure hinged to said trunk compartment and spring urged to close said second opening, and a lock carried by the inner face of said closure and having manually operable means for effecting selective latching and released settings.

2. In an automobile having a trunk compartment accessible through a large top opening spanned by a lid having a lock, the improvement consisting of a second opening at the side of and communicating with said trunk compartment spaced from said first opening, a closure hinged to said trunk compartment and spring urged to close said second opening, and a lock for said closure accessible by reaching through either of said openings and having manually operable means controlling selective latching and released settings, said closure being hinged at its upper end and said closure lock being located at the inner face of the lower end of said closure.

3. In an automobile having a trunk compartment accessible through a large top opening spanned by a lid having a lock, the improvement consisting of a second opening at the side of and communicating with said trunk compartment spaced from said first opening, a closure hinged to said trunk compartment and spring urged to close said second opening, and a lock for said closure accessible by reaching through either of said openings and having manually selective latching nad released settings, said closure lock being normally spring urged to locking position, and selectively operable manually actuable means located within said trunk compartment for maintaining said closure lock inoperative.

4. In an automobile having a trunk compartment accessible through a large top opening spanned by a lid having a lock, the improvement consisting of a second opening at the side of and communicating with said trunk compartment spaced from said first opening, a closure hinged to said trunk compartment and spring urged to close said second opening, and a lock for said closure mounted at the inner face thereof and accessible through both of said openings and having manually selective latching and released settings, said closure lock including a bolt carrier, a bolt slidable in said carrier, resilient means for projecting said bolt to locking position, and means located within said trunk compartment for locking said bolt in retracted position.

5. In an automobile having a trunk compartment accessible through a large top opening spanned by a lid having a lock, the improvement consisting of a second opening at the side of and communicating with said trunk compartment spaced from said first opening, a closure hinged to said trunk compartment and spring urged to close said second opening, and a lock for said closure accessible through both of said openings and having manually selective latching and released settings, said closure lock including a bolt carrier, a bolt slidable in said carrier, resilient means for projecting said bolt from retracted to locking position, said bolt carrier having a bayonet slot, said bolt having a transversely extending recess, and a member slidable in said slot and recess and operable in one position to hold said bolt retracted.

6. An automobile comprising a body having a trunk portion, said trunk having a large top opening and a comparatively small side opening, a lid hinged to said trunk and spanning said top opening, a lock for said lid manipulatable and accessible from the exterior of said body, a closure hinged to said trunk and spring urged to span said side opening, and a lock for said closure carried by the inner face thereof and including a part manually manipulatable and accessible by reaching through either of said openings.

7. An automobile comprising a body having a trunk portion having side, bottom and top walls, said body having a wheel well defining a part of the bottom of said trunk, said trunk portion having a large top opening and a comparatively small side opening located above said wheel well, a lid hinged to said trunk and spanning said top opening, a lid lock, a closure hinged to said trunk and spring urged to closed position spanning said side opening, and a lock carried by said closure and completely confined within the confines of said trunk said lock having an actuator, and means for setting said actuator in released position.

References Cited in the file of this patent

UNITED STATES PATENTS

| | | |
|---|---|---|
| 1,632,672 | Obergfell et al. | June 14, 1927 |
| 2,469,283 | Steele | May 3, 1949 |
| 2,474,992 | Stephenson et al. | July 5, 1949 |